United States Patent [19]

Hansen

[11] Patent Number: 5,616,881
[45] Date of Patent: Apr. 1, 1997

[54] INFLATOR SOCKET PIN COLLAR FOR INTEGRATED CIRCUIT INITAITOR WITH INTEGRAL METAL OXIDE VARISTOR FOR ELECTRO-STATIC DISCHARGE PROTECTIONS

[75] Inventor: David D. Hansen, Clearfield, Utah

[73] Assignee: Morton International, Inc., Chicago, Ill.

[21] Appl. No.: 456,257

[22] Filed: May 30, 1995

[51] Int. Cl.$^6$ .............................. F42B 3/18; B60R 21/16
[52] U.S. Cl. ...................... 102/202.4; 102/202.1; 102/202.7; 102/202.14; 280/728.1
[58] Field of Search ........................... 102/202.1, 202.2, 102/202.3, 202.5, 202.7, 202.8, 202.9, 202.12, 202.14; 361/247, 248; 280/728.1

[56] References Cited

U.S. PATENT DOCUMENTS

| | | | |
|---|---|---|---|
| 3,227,083 | 1/1966 | Moses et al. | 102/202.1 |
| 3,274,937 | 9/1966 | Kyle | 102/202.1 |
| 3,306,202 | 2/1967 | Menichelli et al. | 102/202.1 |
| 3,753,403 | 8/1973 | Menichelli | 102/202.1 |
| 3,821,686 | 6/1974 | Harnden, Jr. | 338/21 |
| 3,928,245 | 12/1975 | Fishman et al. | 252/521 |
| 4,041,436 | 8/1977 | Kouchich et al. | 338/21 |
| 4,103,274 | 7/1978 | Burgess et al. | 338/21 |
| 4,103,619 | 8/1978 | Fletcher et al. | 102/28 R |
| 4,306,499 | 12/1981 | Holmes | 102/202.4 |
| 4,307,663 | 12/1981 | Stonestrom | 102/202.4 |
| 4,422,381 | 12/1983 | Barrett | 102/202.2 |
| 4,441,427 | 4/1984 | Barrett | 102/202.6 |
| 4,517,895 | 5/1985 | Rucker | 102/202.2 |
| 4,994,125 | 2/1991 | Mei | 149/22 |
| 5,027,707 | 7/1991 | Mei | 102/202.8 |
| 5,036,768 | 8/1991 | Dow et al. | 102/202.2 |
| 5,039,452 | 8/1991 | Thompson et al. | 252/518 |
| 5,099,762 | 3/1992 | Drapala | 102/202.1 |
| 5,200,574 | 4/1993 | Cunningham et al. | 102/530 |
| 5,241,910 | 9/1993 | Cunningham et al. | 102/530 |
| 5,243,911 | 9/1993 | Dow et al. | 102/202.2 |
| 5,279,225 | 1/1994 | Dow et al. | 102/202.2 |
| 5,290,060 | 3/1994 | Smith | 280/737 |
| 5,301,979 | 4/1994 | Allard | 280/737 |
| 5,345,872 | 9/1994 | Takahashi et al. | 102/202.2 |
| 5,353,707 | 10/1994 | Duguet | 102/290 |
| 5,355,800 | 10/1994 | Dow et al. | 102/202.2 |
| 5,367,956 | 11/1994 | Fogle, Jr. | 102/202.2 |
| 5,433,147 | 7/1995 | Brede et al. | 102/202.2 |
| 5,454,320 | 10/1995 | Hilden et al. | 102/202.7 |
| 5,509,576 | 4/1996 | Weinheimer et al. | 222/5 |

FOREIGN PATENT DOCUMENTS 0631104  12/1994  European Pat. Off. .

OTHER PUBLICATIONS

V. Menichelli, A Varistor Technique To Reduce The Hazards of Electrostatics To Electroexplosive Devices (1974).

Primary Examiner—Michael J. Carone
Assistant Examiner—Theresa M. Wesson
Attorney, Agent, or Firm—Corinne R. Gorski; Gerald K. White

[57] ABSTRACT

An inflator socket pin collar which includes integral electrostatic discharge protection for an initiator of an air bag inflator. The collar includes a body having first and second opposed ends. An upper chamber is disposed in the first end and a lower chamber disposed in the second end. The second chamber is capable of receiving the electrical connector of the vehicle. An insert is located in the first chamber. The insert includes a pair of socket pins for connecting the initiator to an electrical connector of a vehicle. A metal oxide varistor is disposed in the insert for protecting the initiator from electrostatic discharge. The initiator is supported by the collar and pins of the initiator mate with the socket pins of the insert.

11 Claims, 2 Drawing Sheets

INFLATOR SOCKET PIN COLLAR FOR INTEGRATED CIRCUIT INITAITOR WITH INTEGRAL METAL OXIDE VARISTOR FOR ELECTRO-STATIC DISCHARGE PROTECTIONS

BACKGROUND OF THE INVENTION

1. Field of the Invention

The present invention relates to an inflator socket pin collar which serves as the electrical connection between an electroexplosive device or initiator and a automobile passenger restraint electrical system, and more particularly, to a collar which supports the electroexplosive device within a gas generator, and which includes a metal oxide varistor for electro-static protection of the electroexplosive device.

2. Description of the Related Art

It is known in the prior art to employ an inflatable occupant restraint system for protecting a passenger of an automobile. Such restraint systems encompass a reaction canister which houses a gas generator or inflator, and an air bag in an uninflated condition. In response to a collision, the gas generator generates gas to inflate and expand the air bag to protect the vehicle occupant.

Inflators for automobile passive restraint systems or other devices require a pyrotechnic initiator or electroexplosive device (EED) to operate the inflator. For actuating the gas generator or inflator an electroexplosive device starts the material of the gas generator burning. The inflator initiator is connected to a crash sensor that is positioned adjacent the initiator or at a remote location in the vehicle.

In operation, the crash sensor sends an electrical signal to the initiator or squib. The initiator fires into the ignitor chamber and ruptures a container, which holds an ignitor material, commonly a mixture of boron and potassium nitrate. The initiator consists of a pair of spaced parallel electrical pins joined at one end by a bridge wire which is embedded within pyrotechnic material. The pyrotechnic material bums with a very hot flame and ignites solid fuel gas generant pellets contained in the combustion chamber. The pellets release a nitrogen gas, which travels through the diffuser chamber and into the protective air bag for protecting occupants of the vehicle.

A common characteristic of electroexplosive devices (EED's) is that the bridge wire is susceptible to inadvertent radiant energy from outside electrostatic charges. This radiant energy, which may be of an electromagnetic or radio frequency origin, can inadvertently initiate the EED. Protection against such radiant energy will herein be referred to as EMI/RFI protection.

One prior art solution to overcome this hazard involves the use of ferrite beads disposed directly within a chamber of the initiator. The ferrite beads absorb the extraneous energy preventing the energy from reaching the bridge wire. See U.S. Pat. No. 4,306,499 to Holmes, which is assigned to the assignee of the present invention.

A problem with the electroexplosive device of Holmes is that incorporation of the EMI/RFI protection directly within the EED increases both the size of the device, as well as, manufacturing costs and time. Moreover, the manufacturer of the gas generator is limited to a specific EED design.

Another solution is a universal squib connector which encompasses a ferrite bead which surrounds the electrical terminal of the EED. See U.S. Pat. Nos. 5,200,574 and 5,241,910 to Cunningham et al.; assigned to the assignee of the present invention. Cunningham et al. discloses universal connectors encompassing EMI/RFI protection, which are permanently secured within the gas generator. The ferrite bead, electrically, is essentially an inductor which impedes the instantaneous change in current flow.

Another problem with known inflator assemblies is that the EED is crimped into the inflator base. This crimping process often damages the initiator if done improperly.

The use of a metal oxide varistor (MOV) to absorb electrostatic energy in an electroexplosive device has recently been explored. See, V. Menichelli, *A Varistor Technique to Reduce the Hazards of Electrostatics to Electroexplosive Devices*, (1974).

Typically, metal oxide varistors are used in surge suppression devices, such as computers. However, the prior art has not explored the use of a MOV in an electroexplosive device used as an initiator in an air bag gas generator.

SUMMARY OF THE INVENTION

It is an object of the present invention to provide an inflator socket pin collar which includes a metal oxide varistor tier the electro-static protection of the initiator of a gas generator, and more particularly, to a collar which acts as the electrical connection between the initiator and an electrical connector of a vehicle and which also supports the initiator within the gas generator.

One advantage of the collar of the present invention is that the collar includes an integral metal oxide varistor which is superior for protecting an integrated circuit initiator from electro-static discharge. The metal oxide varistor is an improvement over the ferrite bead of the prior art because of improved heat dissipating characteristics due to the placement of the metal oxide varistors between the socket pins and the collar.

Another advantage of the present invention is that collar of the present invention supports the initiator and the laser weld between the collar and initiator provides a superior hermetic seal between the components that does not damage the initiator.

In accomplishing these and other objectives of the invention, there is provided an inflator socket pin collar which includes integral electrostatic discharge protection for an initiator of an air bag inflator. The collar includes a body having first and second opposed ends. An upper chamber is disposed in the first end and a lower chamber disposed in the second end. The second chamber is capable of receiving the electrical connector of the vehicle. An insert is located in the first chamber. The insert includes means for connecting the initiator to an electrical connector of a vehicle. A metal oxide varistor is disposed in the insert for protecting the initiator from electrostatic discharge.

Other features and advantages of the present invention will become apparent from the following description of the invention which refers to the accompanying drawings.

DETAILED DESCRIPTION OF THE PREFERRED EMBODIMENTS

Figure 1:
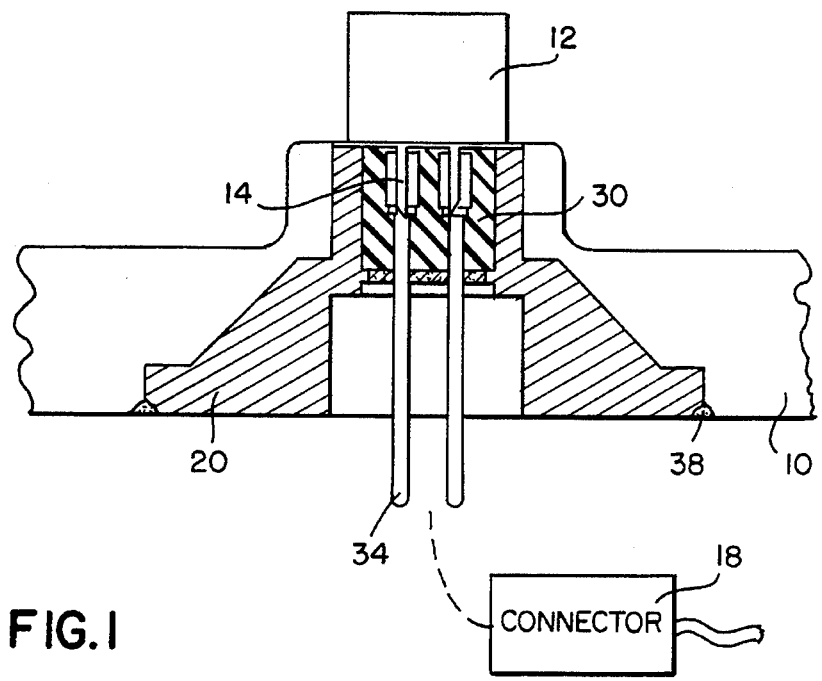
FIG. 1 is a cross-section of an inflator base incorporating the collar of the present invention.

Referring to FIG. 1, there is shown a housing base 10 of a gas inflator. An electroexplosive device 12 is mounted in a collar 20. The electroexplosive device 12 can be an integrated circuit initiator which incorporates a semiconductor bridge, printed circuit bridge, or hot wire to burn pyrotechnic material of the initiator.

Figure 2:
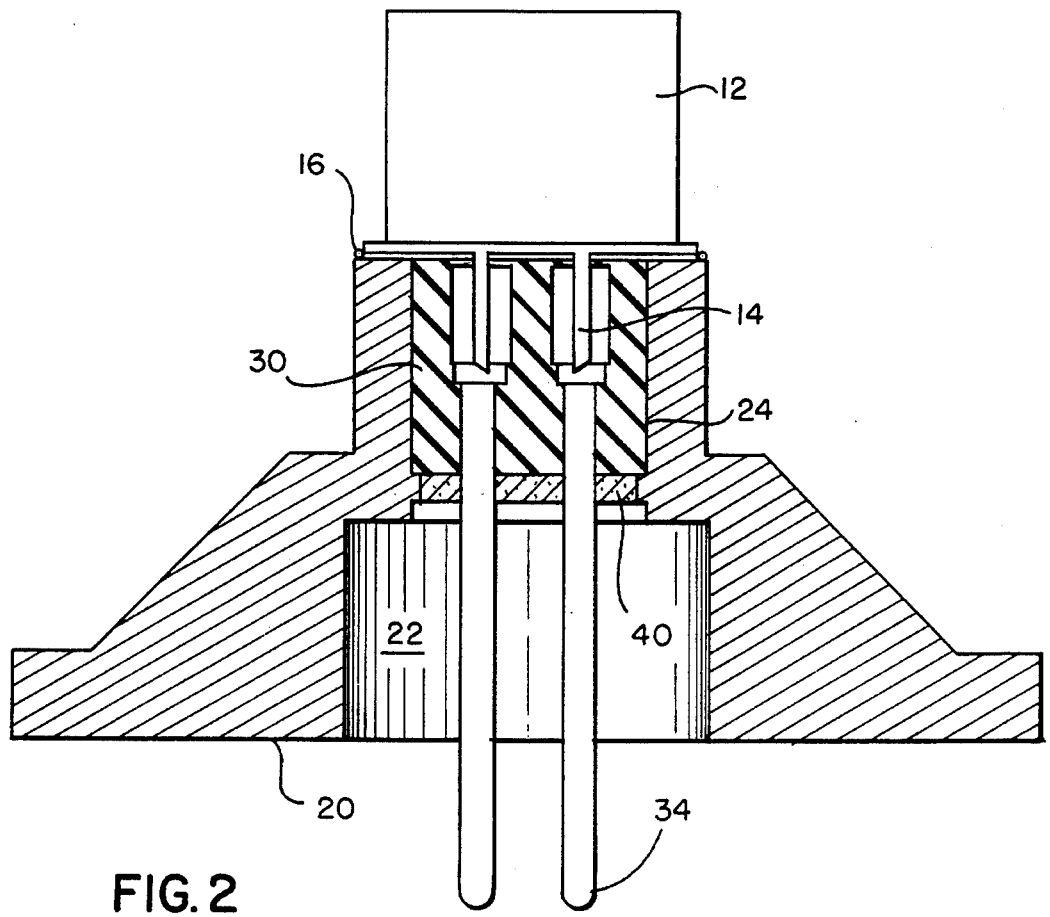
FIG. 2 is an enlarged cross-section of the collar of the present invention supporting an integrated circuit initiator.
Figure 3:
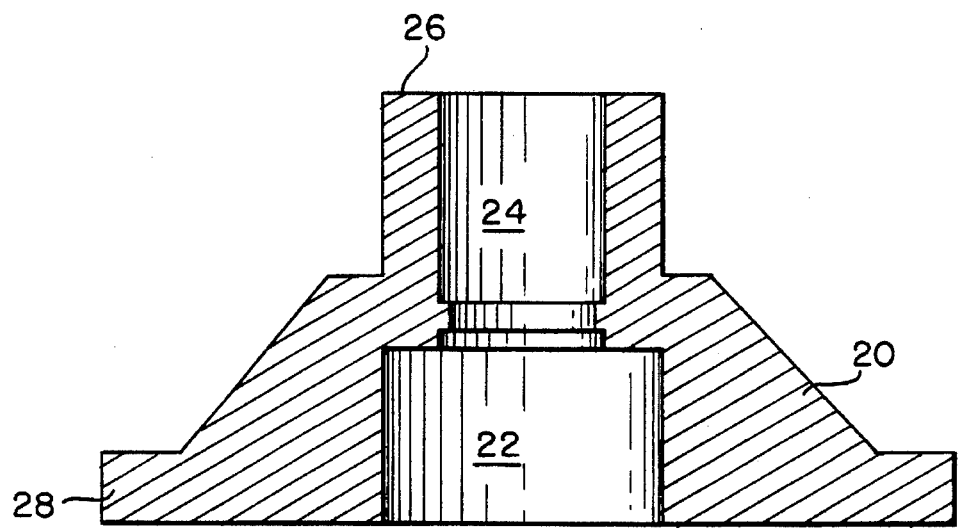
FIG. 3 is a cross-section of the collar of the present invention.

Referring to FIGS. 2 and 3, collar 20 is divided into two chambers, lower chamber 22 and upper chamber 24. The collar can be made of stainless steel. Lower chamber 22 provides for the electrical connection between a connector of an automobile passive restraint system electrical harness assembly 18 and the integrated circuit initiator 12.

Figure 4:
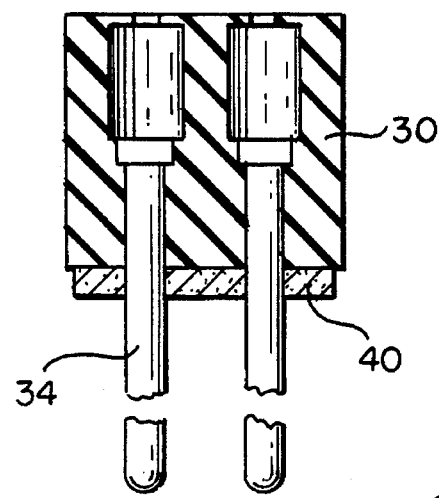
FIG. 4 is a cross-section of the molded insert incorporating the metal oxide varistor according to the present invention.

Upper chamber 24 receives a pre-molded insert 30. As shown in FIGS. 2 and 4, insert 30 incorporates socket pins 34 and a metal oxide varistor 40 which provides the EMI/RFI protection. Insert 30 is a female type socket pin which receives the mating protruding pins 14 of the initiator 12 (FIG. 2). Metal oxide varistor 40 is disc-shaped and is press fit over the socket pins 34. The length of the metal oxide varistor 40 determines the actual breakdown voltage and thus, allows conformance to specific customer requirements. The MOV is a pressed and sintered powder having a composition of 90% zinc oxide and 10% bismuth oxide. It should be appreciated that the MOV of the present invention can be produced from other suitable materials.

Next, the method of assembling the collar, initiator and insert will be described. The insert 30 with socket pins 34 is press fit into chamber 24 of collar 20. Next, the pins 14 of the integrated circuit initiator 12 are inserted into the insert socket pins 34. A circumferential weld 16 (FIG. 2) is performed by laser to provide a circumferential hermetic seal and support between the initiator 12 and a shoulder 26 of collar 20 (FIGS. 2 and 3). The collar 20 is then mounted in base 10 of the gas inflator by any suitable means, such as a circumferential tig weld 38 (FIG. 1).

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An inflator socket pin collar including integral electrostatic discharge protection for an initiator of an air bag inflator comprising:

a body having first and second opposed ends;

a first chamber disposed in said first end;

a second chamber disposed in said second end;

an insert disposed in said first chamber, said insert including means for connecting the initiator to an electrical connector of a vehicle;

a metal oxide varistor disposed in said insert for protecting the initiator from electrostatic discharge; and wherein said second chamber is capable of receiving the electrical connector of the vehicle.

2. The inflator socket pin collar of claim 1, wherein the metal oxide varistor is made of a pressed powder.

3. The inflator socket pin collar of claim 2, wherein the pressed powder is 90% zinc oxide and 10% bismuth oxide.

4. The inflator socket pin collar of claim 1, wherein said connecting means comprises a pair of socket pins extending through said insert and into said lower chamber.

5. The inflator socket pin collar of claim 1, wherein said collar is made of stainless steel.

6. The inflator socket pin collar of claim 1, further comprising a shoulder at said first end, wherein the initiator abuts against the shoulder when assembled in the inflator.

7. The inflator socket pin collar of claim 1, further comprising a flange at said second end for mounting the collar to a housing base of the inflator.

8. The inflator socket pin collar of claim 1, wherein said insert is made of a moldable material.

9. A method of assembling an inflator socket pin collar including integral electrostatic discharge protection and an initiator of an air bag inflator comprising the steps of:

providing a collar having first and second opposed ends, the collar including a first chamber disposed in said first end and a second chamber disposed in said second end;

inserting an insert into said first chamber, said insert including means for connecting the initiator to an electrical connector of a vehicle and a metal oxide varistor for protecting the initiator from electrostatic discharge;

mounting the collar in a housing base of the inflator;

connecting the initiator to the first end of said collar such that pins of the initiator mate with the connecting means of the insert; and inserting an electrical connector of a vehicle into said second chamber to engage the connecting means of the insert.

10. The method of claim 9, further comprising the step of attaching the initiator to the collar.

11. The method of claim 10, wherein the collar and initiator are attached by a circumferential laser weld.

\* \* \* \* \*